(12) United States Patent
Nazuka et al.

(10) Patent No.: US 6,591,065 B1
(45) Date of Patent: Jul. 8, 2003

(54) SINGLE-LENS REFLEX CAMERA HAVING A FOCUSING DETECTION SENSOR CAPABLE OF CALIBRATING, AND A VIEWFINDER

(75) Inventors: Osamu Nazuka, Saitama (JP); Takafumi Iwasaki, Saitama (JP); Masahide Takeda, Saitama (JP); Takayuki Tsuchiyama, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 10/151,234

(22) Filed: May 20, 2002

(51) Int. Cl.[7] ............................................. G03B 13/36
(52) U.S. Cl. ...................... 396/100; 396/147; 396/150; 396/271
(58) Field of Search ..................... 396/148–152, 396/147, 373, 100, 271

(56) References Cited

U.S. PATENT DOCUMENTS 4,104,650 A * 8/1978 Hosoe et al. ............ 396/148 X
4,357,086 A * 11/1982 Shimomura et al. ..... 396/152 X
4,360,256 A * 11/1982 Grassl .................... 396/148 X

FOREIGN PATENT DOCUMENTS

JP          2000-75344          3/2000          ............ G03B/7/099

* cited by examiner

Primary Examiner—W. B. Perkey
(74) Attorney, Agent, or Firm—Jacobson Holman PLLC

(57) ABSTRACT

A focusing detection sensor is positioned in a viewfinder in a single-lens reflex camera but is nevertheless able to determine a focal point on an image of an object with enhanced accuracy. For that purpose, a single-lens reflex camera includes a camera body having a focusing plate with a reference mark in an optically equivalent position to film, a viewfinder replaceably attached to the camera body, a focal point detecting means for determining a focal point, deviation detection means for determining deviations for both the reference mark and the focal point, respectively, calibration means for correcting focal point data based on the output from the deviation detecting means, and a trigger means for enabling a user to activate the calibration means.

7 Claims, 11 Drawing Sheets

FIG.11A  CALIBRATION IS BEING PROCESSED
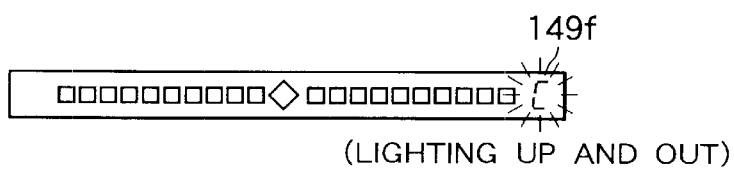
(LIGHTING UP AND OUT)
FIG.11B  NORMAL COMPLETION OF CALIBRATION
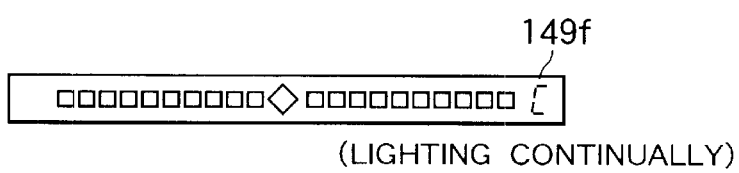
(LIGHTING CONTINUALLY)
FIG.11C  ABNORMAL COMPLETION OF CALIBRATION
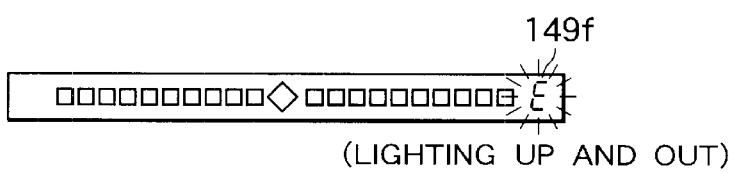
(LIGHTING UP AND OUT)
FIG.12
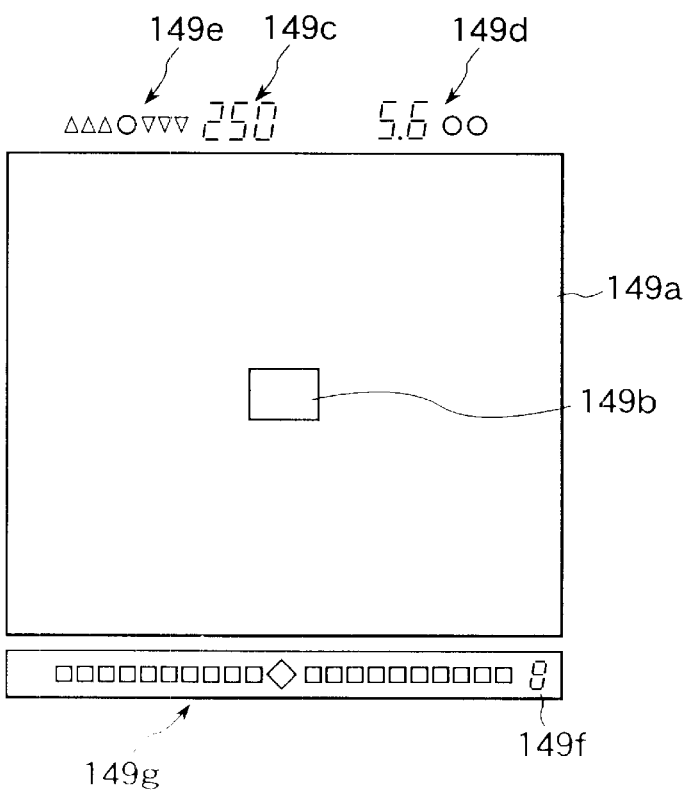

SINGLE-LENS REFLEX CAMERA HAVING A FOCUSING DETECTION SENSOR CAPABLE OF CALIBRATING, AND A VIEWFINDER

FIELD OF THE INVENTION

The present invention relates to a single-lens reflex camera having a focusing detection sensor capable of calibrating, and a viewfinder.

BACKGROUND ART

In many of the prior art single-lens reflex cameras, a focusing detection sensor, which is used to detect a focal point on an image of an object, is usually located below a main mirror within a camera body. Thus, the single-lens reflex camera having the focal point sensor in a position of or behind a focusing plate is not generally available yet.

Japanese Patent Laid-Open No. 2000-75344, for instance, discloses the aforementioned type of the single-lens reflex camera having a focusing detection sensor located below a main mirror within its body.

However, in such a prior art single-lens reflex camera that is configured to have the focusing detection sensor located below the main mirror within the camera body, a space must be reserved for the sensor below the main mirror, and this disadvantageously disturbs an attempt to downsize the camera body.

If the focusing detection sensor is located in a position of or behind the focusing plate within a replaceable viewfinder, accuracies in terms of an attachment of the replaceable viewfinder and of a location of the focusing detection sensor must be considerably enhanced to minimize a precision degradation in detecting a focal point on an object image which is resulted from varied combinations of compatible but independent units of the replaceable finder and camera body.

Furthermore, since such a replaceable viewfinder is usually of relatively large dimensions, an optical length from the camera body to the focusing detection sensor is liable to alter due to thermal expansion of optical components and metal parts used therein, and thus, it is considerably hard to retain a satisfactory level of accuracy in detecting the focal point on the object image.

Accordingly, it is an object of the present invention to provide a single-lens reflex camera used in combination with a replaceable viewfinder which has a focal point detecting sensor built therein but is nevertheless capable of detecting a focal point on an image of an object at high accuracy, and specifically, an inventors' attempt is to devise an arrangement of the camera and viewfinder that is capable of accurately detecting a deviation of an imaging field (image plane of the object) of a photographic lens from an optically equivalent plane to film (i.e., detecting a defocusing length or a focal shift).

It is another object of the present invention to provide a single-lens reflex camera used in combination with a replaceable viewfinder which is capable of keeping a detection speed of a focal shift sufficiently high and eliminating inconvenience of a camera user during the calibration for the purpose of detecting a focal shift at high accuracy.

SUMMARY OF THE INVENTION

In accordance with the present invention which is made to overcome the aforementioned disadvantages in the prior art, a single-lens reflex camera is comprised of a camera body having a focusing plate with a reference mark in an optically equivalent position to film, a viewfinder replaceably attached to the camera body, means positioned in the viewfinder for detecting a focal point, means positioned in the viewfinder for determining deviations for the reference mark and the focal point, respectively, calibration means receiving the output from the deviation determining means for correcting data on the focal point, and means enabling a user to activate the calibration means.

In one aspect of the present invention, a sensor is used to detect a focal point on an image of the reference mark provided in the focusing class within the camera body. The calibration means receives a detection result from the focusing detection sensor to compute a variation in an optical length from the focusing plate to the focusing detection sensor. The means serving as a trigger enables the user to activate the calibration means so that the variation in an optical length from the focusing plate to the sensor is calibrated. A deviation of the focal point on the object image, which is detected by the focusing detection sensor, is corrected based upon the calibration result. In this way, an error resulted from the varied optical length is corrected, and thus, an enhanced accuracy in detecting a defocusing length can be attained.

Preferably, the calibration means includes a memory to store the calibration result on the optical length.

In one aspect of the present invention, since the calibration result can be stored once it is obtained, there is no need of repeating the calibration for each photo shooting.

The calibration means preferably includes an illumination means placed in the camera body or the viewfinder for irradiating the reference mark, and additionally, it is desirable to use the calibration means under a condition where light entering the camera body through a photographic lens is cut off.

In one aspect of the present invention, the calibration is carried out without influence of the light entering the photographic lens, and hence, a calibration accuracy can be improved.

The calibration preferably includes a sensing means for determining if the light entering the camera body through the photographic lens is satisfactorily cut off.

Advantageously, an additional means is included to give an alert or a display to a user and let him or her to know that the calibration means is in use.

Also, in accordance with the present invention, a viewfinder is used with a single-lens reflex camera and replaceably attached to a camera body having a focusing plate therein. The viewfinder is capable of detecting a reference mark which is formed in the focusing plate and positioned in an optically equivalent position to film, and it comprises means for determining a focal point of the finder, means for determining deviations for the reference mark and the focal point, respectively, calibration means receiving the output from the deviation determining means for correcting data on the focal point, and means enabling a user to activate the calibration means.

BRIEF DESCRIPTION OF THE DRAWINGS

The invention will be better understood when taken in conjunction with the accompanying drawings through which like reference numerals denote similar or equivalent components, wherein

FIG. 11 is a schematic diagram showing an indicator displayed in a lower part of a view in a finder for the embodiment of the present invention; and FIG. 12 is a schematic diagram showing indicator representations displayed in various part of a view in the finder for the embodiment of the present invention.

DETAILED DESCRIPTION OF THE INVENTION

A best mode of a single-lens reflex camera according to the invention will now be described in detail with reference to the drawings.

(1) Preferred Embodiments

First, a preferred embodiment of the single-lens reflex camera according to the present invention will be discussed. The embodiment is distinctive because of its "focusing aid" feature.

(1.1) General Configuration of the Camera

A general configuration of the exemplary single-lens reflex camera will be outlined below.

Figure 1:
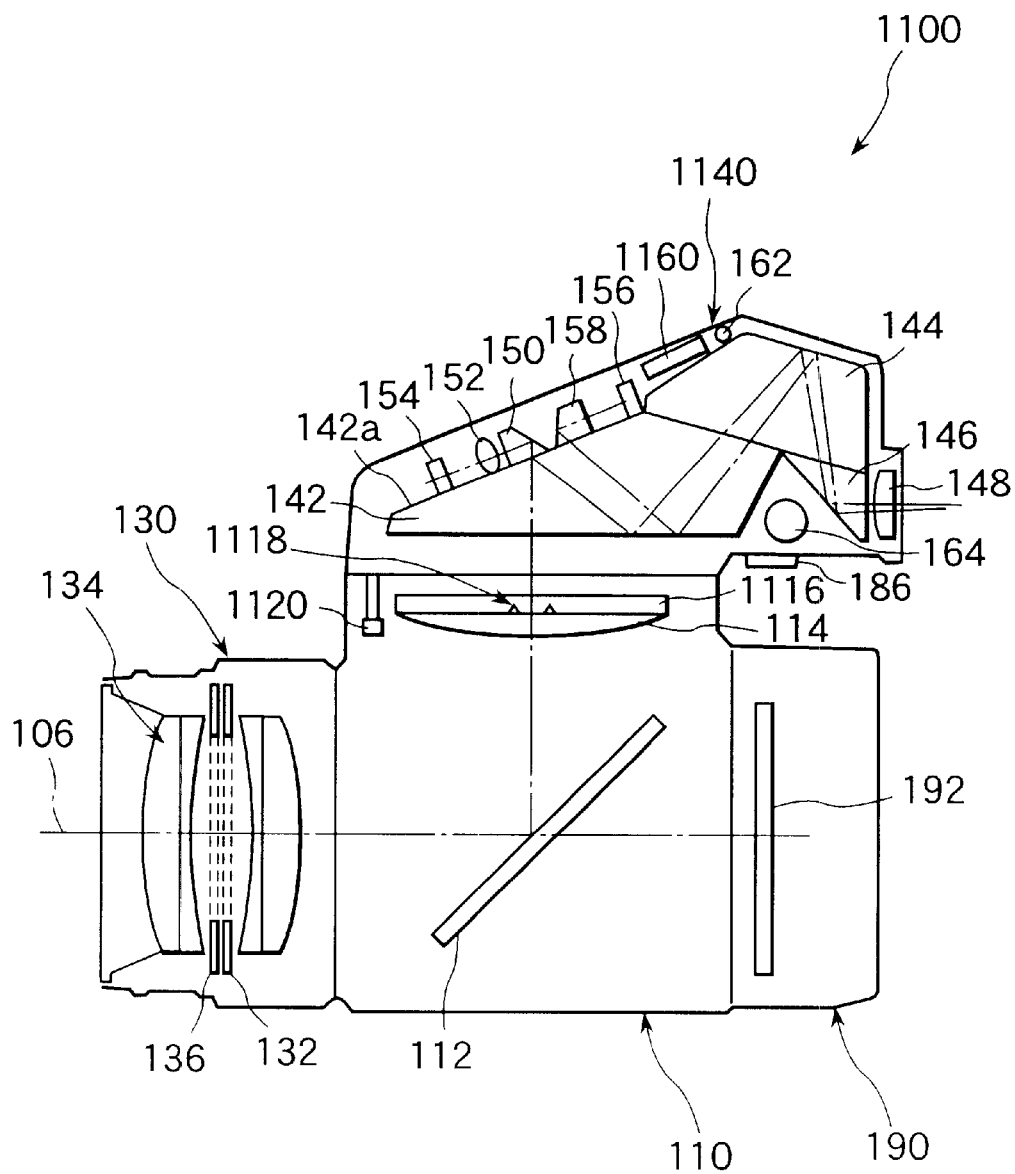
FIG. 1 is a cross sectional view showing a preferred embodiment of a single-lens reflex camera according to the present invention.
Figure 2:
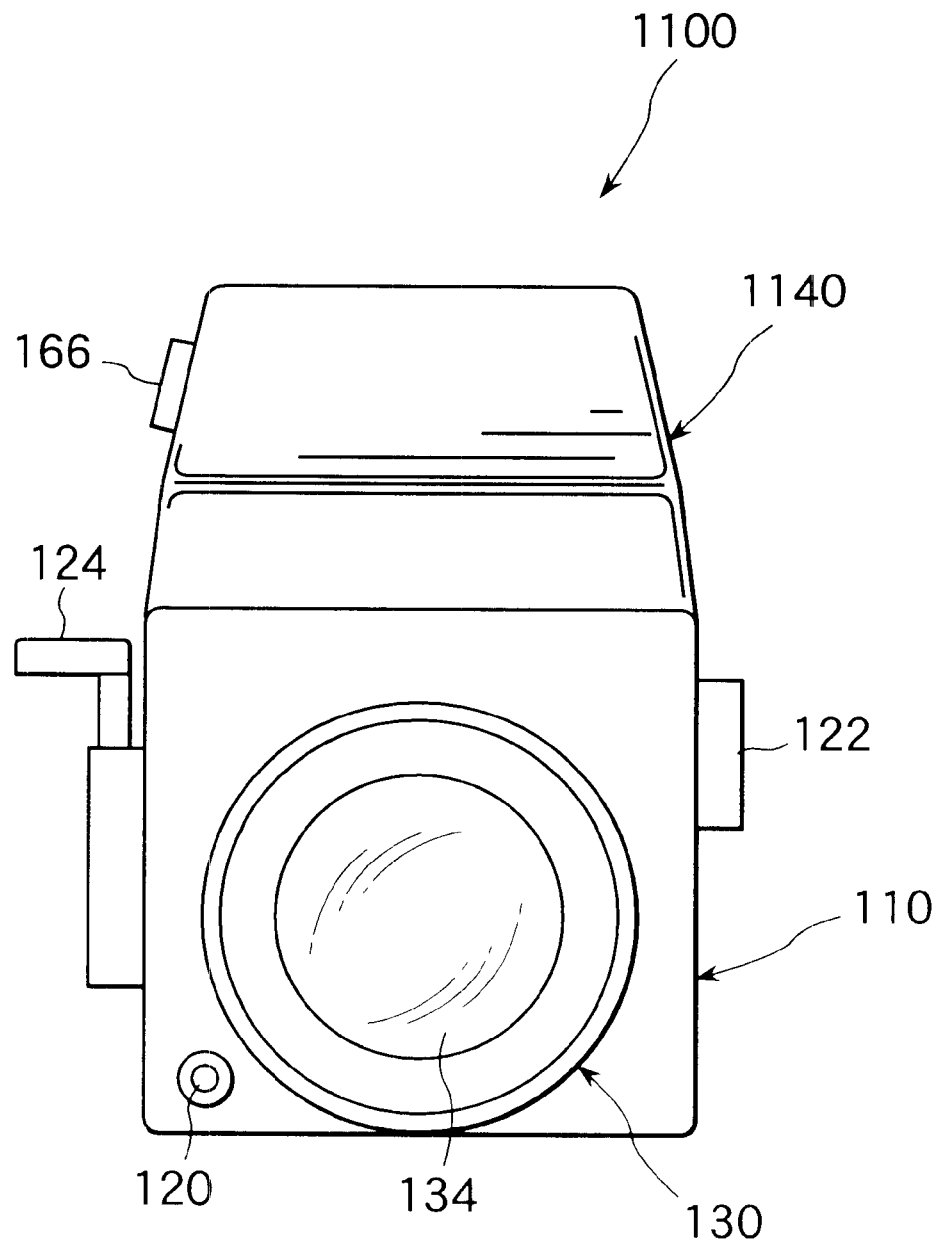
FIG. 2 is a front view showing the embodiment of the present invention.

Referring to FIGS. 1 and 2, a single-lens reflex camera 1100 of the invention is a finder replaceable single-lens reflex camera, including a camera body 110, a photographic lens 130, a viewfinder 1140, and a film pack 190.

The viewfinder 1140 is replaceably attached to the camera body 110. For instance, finder guide grooves are provided on a top side of the camera body 110 while finder attachment strips are provided on a bottom side of the viewfinder 1140. After the finder attachment strips are fitted in the finder guide grooves, the viewfinder 1140 is slid along against the camera body 110 to fix with each other.

The photographic lens can be detachably mounted in the camera body 110. For example, a lens mount is provided on a rear side of the photographic lens, and a bayonet mount is provided in a front side of the camera body 110. The lens mount of the photographic lens is fitted on the bayonet mount of the camera body 110, and thereafter, the photographic lens 130 is rotated relative to the camera body 110 to fix with each other. The photographic lens 130 includes lens optics 134, a stop 136, a shutter 132, and a distance regulating mechanism (not shown), respectively, in relation with an optical axis 106.

A film 192 is housed in a film pack 190. The film 192 may be manually wound, or otherwise, a motor is used to automatically wind the film 192.

Alternatively, the photographic lens 130 may be fixedly built in the camera body 110.

In another alternative version, the film pack 190 may be omitted, and instead, the film 192 is positioned in the camera body.

(1.2) Configuration of the Camera Body

A configuration of the camera body will now be discussed in accordance with the embodiment of the invention.

A mirror 112, which is used to alter an optical path extending from the object through the photographic lens 130, is mounted in the camera body 110. A condenser lens 114 is installed in the camera body 110 to increase marginal light in the viewfinder 140. A focusing plate 1116 is located in the camera body 110 so as to be in an optically conjugate position with a plane of the film 192. A planar side of the condenser lens 114 is faced with one of the opposite sides of the focusing plate 1116.

A shutter button 120 is placed in the camera body 110. The shutter button 120 may be positioned in the front side of the camera body 110, or instead, it may be on the top side of the same. Alternatively, it may be on either of the lateral sides of the camera body 110. A shutter speed adjustment dial 122 is placed on one of the lateral sides of the camera body 110. A crank 124 is located on one side of the camera body 110 for winding the film 192. A control of the shutter speed may be performed either mechanically or electronically. With an electronic speed control system for the shutter, a crystal oscillator (not shown) controlling the shutter speed, IC (not shown), and a battery (not shown) are preferably installed within the camera body 110.

In one variation of the aforementioned embodiment, the motor (not shown) used to wind the film 192 may be built in the camera body 110. For that purpose, a battery is installed in the camera body 110 to power the motor, and the battery is also used as a power source to actuate the crystal oscillator and the IC so as to control the shutter speed.

After loading and winding the film 192 and adjusting the shutter speed on the dial 122, the shutter button 120 is depressed down for the work of the shutter 132.

Instead of attaching the shutter 132 to the photographic lens 130, the shutter may be built in the camera body 110.

The single-lens reflex camera of the present invention may be of any of the types of the single-lens reflex camera, including those that have a built-in lens shutter, a built-in focal plane shutter, and a combination of the both, respectively.

(1.3) Configuration of the Viewfinder

A configuration of the viewfinder will now be discussed in the context of the embodiment of the single-lens reflex camera according to the present invention.

The viewfinder 140 is comprised of a first prism 142 serving to bend an optical path of light flux emitted from the object through the condenser lens 114 and the focusing plate 1116, a second prism 144 serving to bend an optical path of the light flux transmitted through the first prism 142, a third prism 146 serving to bend an optical path transmitted through the second prism, and an eyepiece lens 148 functioning to magnify an image of the object created through the third prism. The light flux emitted from the object and transmitted through the photographic lens 130 is reflected by the mirror 112, and after propagating through the condenser lens 114 and the focusing plate 1116, it is converged and/or diverged into an erected image. Thus, a user can observe the magnified erected image through the eyepiece 148.

Alternatively, a plurality of mirrors may be substituted for the prisms to attain the similar effects.

The first prism 142 is topped with a detection prism 150 on its upper surface 142*a* which first reflects entering beams through the focusing plate 1116. A junction of the first prism 142 with the detection prism 150 is partially or entirely used as a half-mirror. Two separator lenses 152, 153 are attached to the viewfinder 140 to converge the light flux from the detection prism 150. Two of the separator lenses 152, 153 are spaced apart from each other. One of them, the first separator lens 152, serves to converge one of two spaced light fluxes transmitted through the photographic lens 130 while the other, the second separator lens 153, converges the other of the light fluxes. For simplification of the illustration, the separator lens 152 alone is depicted in FIG. 1.

After being converged by the separator lenses 152, 153, an incident light beam is analyzed to detect a focal point on the object image. Specifically, the viewfinder 1140 has a focusing detection sensor 154 that functions as a focal point detection means for detecting a deviation of an imaging plane (an image plane of the object) of the photographic lens 130 from an optically equivalent plane of film (i.e., a defocusing length or a focal shift). Preferably, the focal point detecting sensor 154 is an area sensor composed of a CCD and other elements, or otherwise, it may be a line sensor. The focusing detection sensor 154 is located in position so as to receive beams converged by the separator lenses 152 and 153.

The viewfinder 1140 also includes a display 156 that is comprised of a display device such as LED, to produce a detection result of the focal point on the object image. The display 156 may be formed of LCD. A display prism 158 is also placed in the viewfinder 1140 and bends an optical path of a flux of light that carries display contents indicated on the display 156. A junction of the display prism 158 with the first prism 142 is partially or entirely used as a half-mirror. The light flux emitted from the display 156 is imaged into an erected image by the first, second, and third prisms 142, 144, and 146. Thus, the user can observe the magnified image through the eyepiece 148 instead of seeing on the display 156. A buzzer 186 provided in the viewfinder 1140 gives a signal to indicate some result on determination of a distance from the object to the plane on the film 192.

Referring to FIG. 1, the focusing information on the object image, which is detected by the focusing detection sensor 154, is arithmetically analyzed, and an IC 1160 in the viewfinder 1140 produces a signal based on a result of the arithmetic operation. The crystal oscillator 162, which is a vibration source to generate a reference signal used for arithmetic operation on the IC 1160, is provided in the viewfinder 1140. A battery 164 is installed in the viewfinder 1140 to serve as a power supply for the focusing detection sensor 154 and the IC 1160.

In a single-lens reflex camera having a battery installed in the camera body 110, the battery in the camera body 110 supplies power to the focusing detection sensor 154 and the IC 1160 without installing the additional battery 164 in the viewfinder 1140.

With reference to FIG. 2, the viewfinder 1140 also includes a mode switch 166 that is calibration trigger means and is used to select an operation mode of the focusing detection sensor 154. The mode switch 166 may alternatively be any of a rotary switch, a slide switch, a push button switch, and a touch sensor switch.

(1.4) Reference Mark and Mark Illuminator

Referring to FIG. 1, the focusing plate 1116 has a reference mark 1118 used in determining a distance between the camera body and the focusing detection sensor. It is preferable that the reference mark 1118 is provided on one side of the focusing plate 116 reverse to the side facing to the first prism 142. This means that the reference mark 118 is fixed in position relative to the camera body.

The reference mark 1118 is positioned so that beams projecting its image can be converged onto the focusing detection sensor 154 by the separator lenses 152 and 153. In other words, the focusing detection sensor 154 is located in a position on which an incident light beam converged by the separator lenses 152 and 153 falls on and creating an image of the reference mark 1118.

Figure 3A:
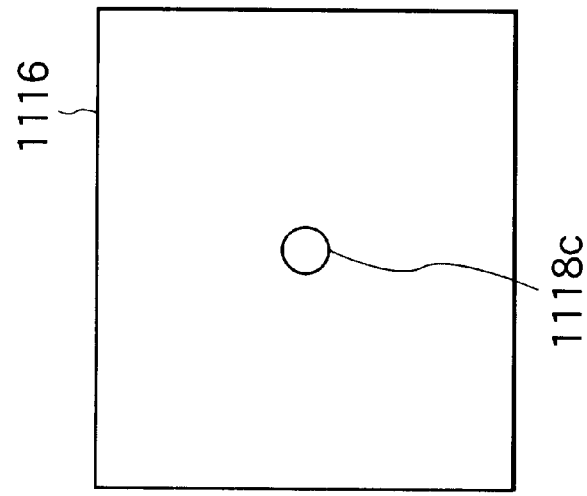
FIG. 3 is a plan view showing an exemplary reference mark used in the embodiment of the present invention.
Figure 3B:
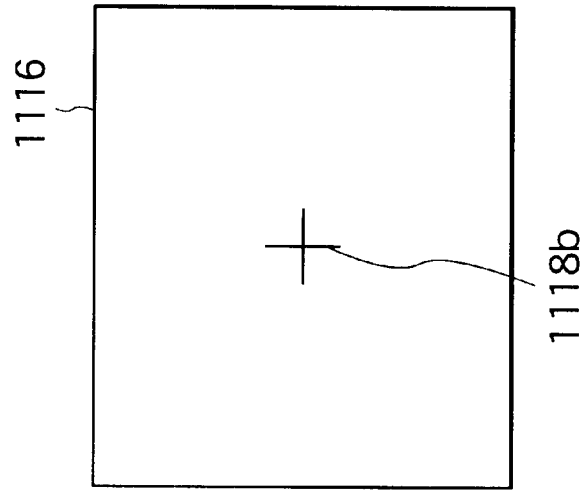
Figure 3C:
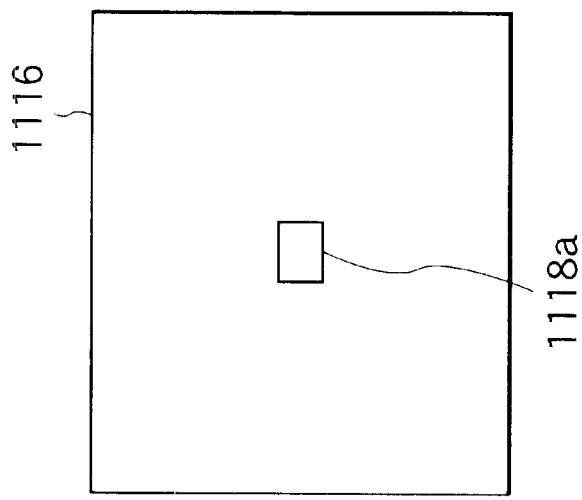

As can be seen in FIG. 3, the drawings respectively demonstrate an example of the reference mark 1118. FIG. 3(A) is a depiction of the reference mark 1118*a* serving as a detection frame as well. FIG. 3(B) represents the reference mark 1118*b* shaped in a cross. FIG. 3(C) depicts the reference mark 1118*c* shaped in a circle. The reference mark 1118 may be dimensioned so that part of it can be recognized on the focusing detection sensor 154.

Figure 4:
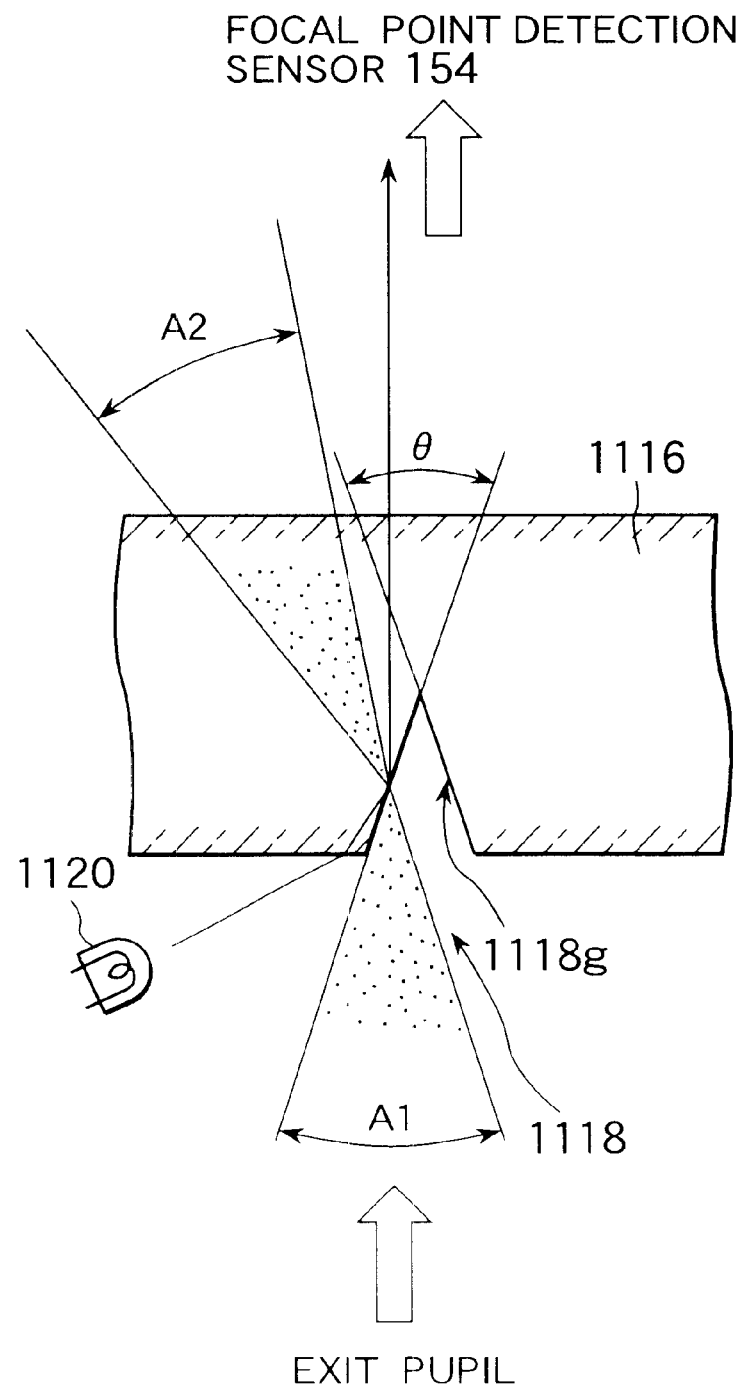
FIG. 4 is a partial schematic sectional view showing the reference mark and part of a mark illuminator used in the embodiment of the present invention.

Referring to FIG. 4, the reference mark 1118 assumes a sharply angled groove 1118*a* engraved on the surface of the focusing plate 1116 reverse to the side facing to the first prism 142 (i.e., on the side proximal to the condenser lens 114). The groove 1118*g* serving as the reference mark 1118 may be sized in width, depth, and apical angle θ so that part of the reference mark can be recognized by the focusing detection sensor. The groove 1118*g* may be made by grinding or partial etching.

The viewfinder 1140 is provided with the mark illuminator 1120 that is a light source irradiating the groove 1118*g*. The mark illuminator 1120 may be a lamp or an LED. The mark illuminator is located closer to the condenser lens 114 and oriented to the groove 1118*g* to illuminate it. Preferably, the mark illuminator 1120 is supplied with power by the battery 164 installed in the viewfinder 1140, or otherwise, the battery (not shown) installed in the camera body 110 may be substituted for the power supply.

Figure 5:
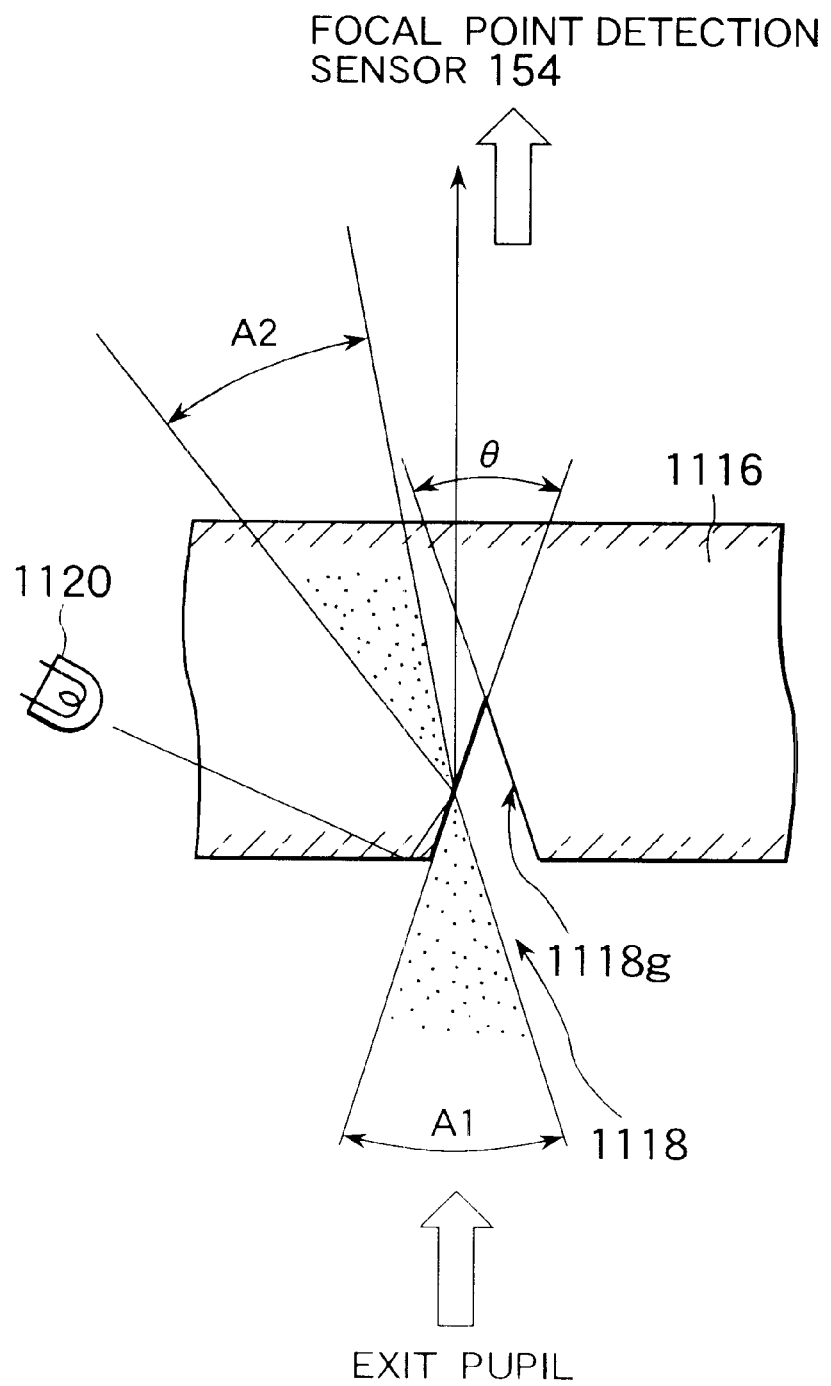
FIG. 5 is a partial schematic cross sectional view showing another arrangement of the reference mark and the part of the mark illuminator used in the embodiment of the present invention.

In a varied version as shown in FIG. 5, the mark illuminator 1120 beside the condenser lens 114 may laterally direct a light beam onto the groove 1118*g*. In such a case, beams emitted from the mark illuminator 1120 are reflected from the surface of the condenser lens 114 to irradiate the groove 1118*g*.

In an additional variation, one or more mirrors (not shown) may be used to reflect beams of the mark illuminator 1120 to illuminate the groove 1118*g* from a lateral side of the condenser lens 114, or alternatively, the groove 1118*g* may be illumined with an incident light beam angled to the surface of the condenser lens 114.

In a further alternative embodiment, the mark illuminator 1120 irradiating the groove 1118*g* may be placed in the camera body 110. In such a case, the mark illuminator 1120 below the condenser lens 114 irradiates the groove 1118*g* with beams darting upward. The mark illuminator 1120 is preferably powered by the battery (not shown) in the camera body 110.

(1.5) Configuration of the Detection Unit

A configuration of the detection unit for the single-lens reflex camera of the present invention will now be discussed.

Figure 6:
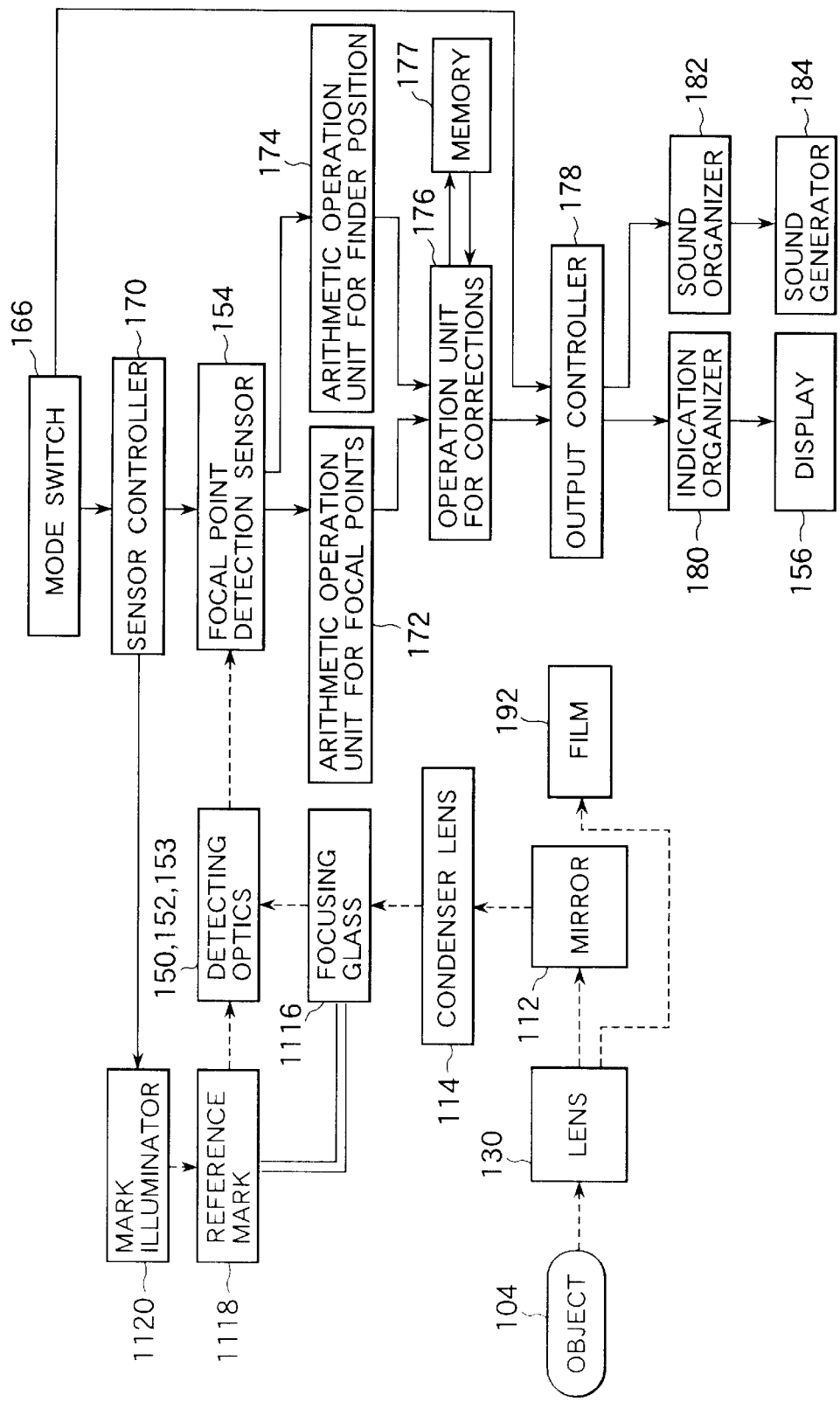
FIG. 6 is a block diagram showing system architecture of the embodiment of the present invention.

As shown in FIG. 6, a sensor controller 170 is provided for controlling the operation of the focusing detection sensor 154. The sensor controller 170 controls the mode switch 166 to select an operation mode. When the mode switch 166 is turned on to select a photographic mode, a light beam from an object 104 is transmitted through the photographic lens, the mirror 112, the condenser lens 114, the focusing plate 1116, and the detection optics (the detection prism 150, and the separator lenses 152 and 153) to enter the focusing detection sensor 154. Turning the mode switch 166 to evoke a calibration mode, the mirror is set up (i.e., the mirror 112 is oriented horizontally), and this results in the light beam proceeding straightforward without deflection toward the condenser lens 114.

At this point of time, the sensor controller 170 permits the mark illuminator 1120 outside a photographic optical path to light up, thereby projecting a line corresponding to the groove 1118g as the reference mark 1118. In this way, the sensor controller 170 detects a position of the reference mark 1118 based upon the light beam incident upon the focusing detection sensor 154.

An arithmetic operation unit 172, which serves as deviation detection means for determining a focal point, receives a signal on the object 104 from the focusing detection sensor 154 to determine the focal point on the image of the object. Another arithmetic operation unit 174, which is included in the calibration means and used to determine a finder position, receives a signal on the camera body 110 from the focusing detection sensor 154 to determine an optical length from the focusing plate 1116 to the focusing detection sensor 154.

An arithmetic operation unit 176, which is also included in the calibration means and used for correction, receives a signal on the result of the focal point detection on the object image from the operation unit 172 and also receives a signal on the optical length between the focusing plate 1116 and the focusing detection sensor 154 from the operation unit 172, so as to correct the detected focal point on the object image based upon those signals. In this way, the focusing detection sensor 154 determines a position of the reference mark 1118, and the result of the determination is utilized to correct the detected focal point on the object image. A memory 177 stores an amount of the correction computed by the arithmetic operation unit 176. The memory is comprised, for example, of an electrically erasable programmable read-only memory (EEPROM).

When the calibration mode is selected with the mode switch 166, the sensor controller 170 permits the mark illuminator 1120 to light up.

(1.6) Configuration of the Output Unit

A configuration of the output unit for the single-lens reflex camera according to the present invention will now be discussed.

As can be seen in FIG. 6, an output controller 178 permits the mode switch to select an output mode, and it produces a signal based upon the result of the focal point detection on the object image, or displays a result of the calibration.

An indication organizer 180 receives the output signal from the output controller 178 and causes the display 156 to display information on the result of the correction computed by the arithmetic operation unit 17G.

A sound organizer 182 receives the output signal from the output controller 178 and activates a sound generator 184 to make sounds based upon the result of the correction computed by the arithmetic operation unit 176. The sound generator 184, for example, may be a buzzer 186 or a speaker. The sound generator 184 may be designed to make sounds when it is determined that the object image is in focus as a result of the computed correction of the focal point. Alternatively, the sound generator 184 may be designed to produce a high tone when front-cell focusing is perceived as a result of the computed correction of the focal point, a low tone when rear-cell focusing is perceived, and an intermediate tone when the computation result shows in-focus.

If not necessary, the indication organizer 180 and the display 156 may be omitted, or the sound organizer 182 and the sound generator 184 may be omitted.

The mode switch 166 can be designed to select an output mode where only the display 156 is activated, or only the sound generator 184 is activated, or even rather, both the display 156 and the sound generator 184 are activated.

In these embodiments, circuitry having various functions is preferably incorporated in the IC 1160. The sensor controller 170, the arithmetic operation units 172, 174, and 176, the memory 177, the output controller 178, the indication organizer 180, and the sound organizer 182 are incorporated in the IC 1160. The IC 1160 further includes CPU, ROM, and RAM.

The IC 1160 may be a PLA-IC installed with programs for various functions.

Also, as required, the single-lens reflex camera of the present invention may include various devices, such as resistor, condenser, coil, diode, and transistor, installed outside the IC.

(1.7) Functions of the Single-Lens Reflex Camera

Functions of the single-lens reflex camera according to the present invention will now be discussed.

Figure 7:
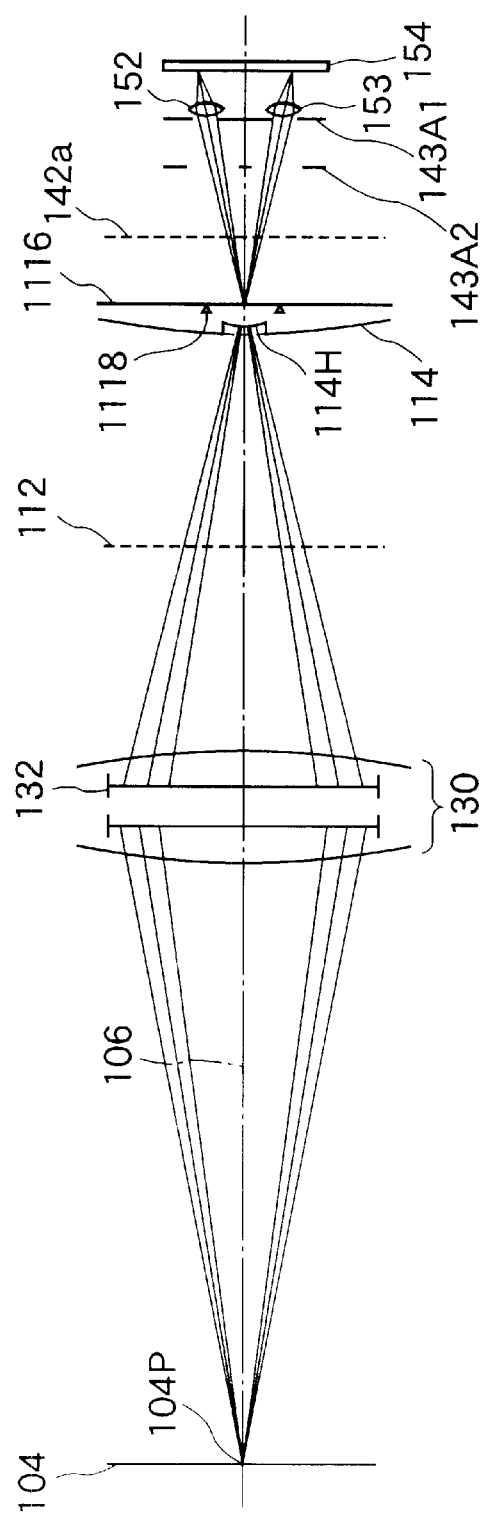
FIG. 7 is an equivalent representation of an optical length from an object to a focal length detection sensor of the embodiment of the present invention.

Referring to FIGS. 1, 6, and 7, especially, FIG. 7 is an equivalent diagram of the optical path from the object 104 to the focusing detection sensor 154 along the optical axis 106, and the mirror 112, the upper surface 142a, and the detection prism 150 are depicted in an exploded fashion.

In the detection area of the camera, a condenser lens 114H, which is in accord with features inherent to the focusing detection sensor 154, is preferably provided. This condenser lens 114H meets the requirement that beams from the object 104, after being split into two beams, should pass through limited areas at the exit pupil of the photographic lens 130. Specifically, the condenser lens 114H is designed to have a feature establishing a relation that views confined by apertures 143A1 proximal to the separator lenses 152 and 153 are equivalent to images created near the exit pupil of the photographic lens 130.

Since a position of the exit pupil varies from a photographic lens to a photographic lens, a position of the reference exit pupil must be assumed in advance. The condenser lens 114H in relation with the viewfinder is designed so that the views at the exit pupil are imaged near the eyepiece lens.

The condenser lens 114H does not always have the same focal length, depending upon whether it works in relation with the viewfinder or with the focusing detection sensor 154. Thus, as shown in FIG. 7, it is desirable that the condenser lens 114H is designed to have two types of focal lengths; that is, a focal length of an optical zone of which focal point is to be detected on the object image is defined as a focal length of the condenser lens 114H cooperative with the focusing detection sensor 154, while a focal length of the periphery of the optical zone is defined as a focal length of the condenser lens 114H cooperative with the viewfinder.

The beam of light diverging out of a single point 104P of the object 104 on the optical axis 106 is diffracted by the photographic lens 130 and deflected by the mirror 112 to fall on the condenser lens 114, and after further being transmitted through the detection area in the focusing plate 1116 and passed through the apertures 143A2 and 143A1, it is converged by the separator lenses 152 and 153 and imaged in two separate areas proximal to an imaging plane of the focusing detection sensor 154.

The focusing plate 1116 is originally used for focusing, and hence, assuming that an accuracy of the focusing plate 1116 is sufficient to the focusing, the focusing detection sensor 154 recognizes the light imaged on the focusing plate 1116 as being zero in defocusing length.

Additionally, with the reference mark 1118 being applied to the imaging plane in the focusing plate 1116, the reference mark 1118 also projects its image which is recognized as being of zero defocusing length (no deviation from the in-focus) by the focusing detection sensor 154.

However, when there arises an error of the optical length from the focusing plate to the focusing detection sensor 154 due to varied combinations of compatible but independent units of the viewfinder 1140 and camera body and their components, the defocusing length of the image of the reference mark 1118 is determined to be any value other than zero.

To shoot this kind of trouble, the mark 1118 serving as the reference is made in part of the detection area in the focusing plate 1116 to make the focusing detection sensor 154 recognize the same, and thus, the error of the optical length from the focusing detection sensor 154 to the focusing plate 1116 resulted from the above-mentioned variations of the assembly can be computed. The computation result on the error is used to correct the focal point on the object image detected by the focusing detection sensor 154.

Referring to FIGS. 4 and 5, as stated above, the groove 1118g is engraved on the side of the first prism 142 reverse to the side facing to the first prism 142 (i.e., the side adjacent to the condenser lens 114) so as to work as the reference mark 1118 in the focusing plate 1116. Thus, the incident light from the photographic lens 130 at an angle Al is diffracted in the groove 1118g and exit in a divergence at an angle A2. Resultantly, the beam of light diverging at the angle A2 would not reach the focusing detection sensor 154, and therefore, the user always identifies black line with the line corresponding to the groove 1118g of the reference mark 1118.

However, when the object 104 is imaged near the reference mark 1118, analyzing only such a range around the reference mark 1118 would not give an accurate defocusing length (phase difference) of the reference mark 1118.

Figure 8:
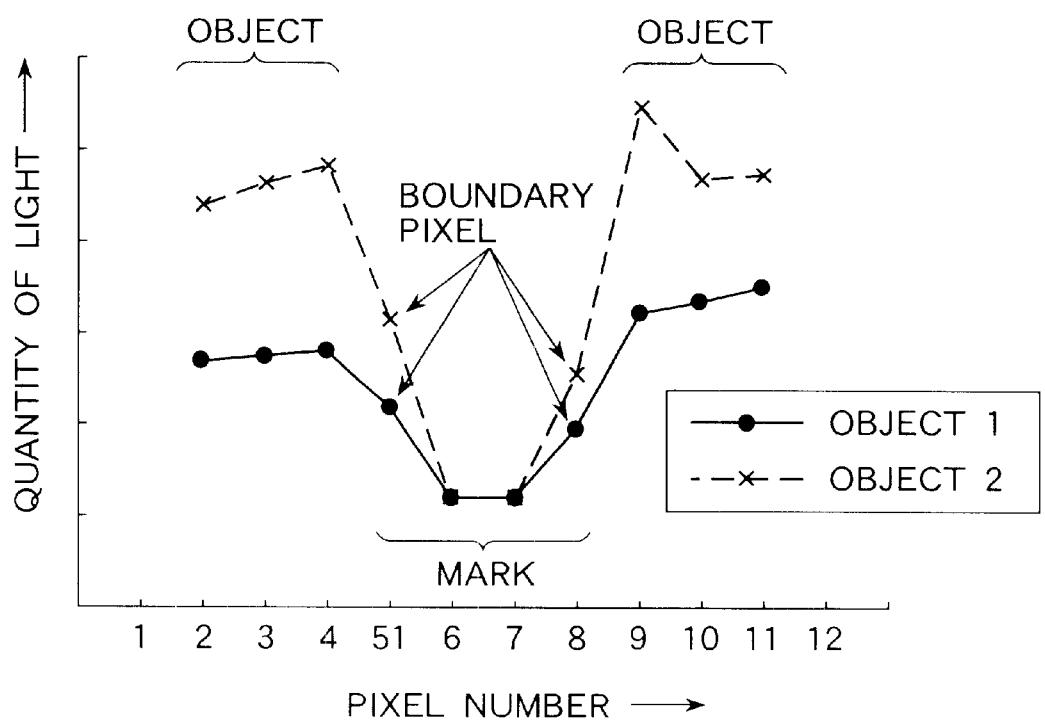
FIG. 8 is a graph illustrating a relation of pixels in the focusing detection sensor with a quantity of light detected thereby in the embodiment of the present invention.

FIG. 8 is a graph illustrating a quantity of light each pixel in the focusing detection sensor 154 senses. In the case shown in FIG. 8, the reference mark 1118 is imaged near pixels numbered 6 and 7 where the detected quantity of light is relatively reduced. In the boundary between imaging points of the reference mark 1118 and the object, the reference mark 1118 is imaged in part of pixels of that zone, the detected quantity of light for those pixels reaches an intermediate level between the detected levels of the quantity of light for the imaging points of the object and the reference mark 1118. Thus, measurements sensed by pixels numbered 5 and 8 in the boundary zone vary from an object to an object, and it is hard to determine the position of the imaging point of the reference mark 1118 with high accuracy.

Hence, the mark illuminator 1120 outside the photographic optical path is lighted to irradiate the reference mark 1118, and comparing output data from the focusing detection sensor 154 in two states where a light beam comes up and comes out on the mark illuminator 1120 is helpful to enhance the accuracy in detecting the imaging point of the reference mark 1118.

However, such a comparison between On- and Off-states of the mark illuminator 1120 takes a longer period of time to detect the imaging point of the reference mark 1118, and measurements are not fully reliable regardless of an affect of the image of the object. Thus, in a modified embodiment, while the calibration mode is selected, the mirror 112 is set up in a horizontal level so as to avoid deflecting the flux of light from the photographic lens 130 toward the focusing plate 1116. Resultantly, during the calibration mode, light from the mark illuminator 1120 reaches the focusing plate 1116.

Referring to FIG. 9 which is a schematic diagram showing data on the reference mark 1118 produced by the focusing detection sensor 154 while the mark illuminator is turned on. A quantity of light sensed by the focusing detection sensor 154 is almost zero in the imagery point of the reference mark 1118 while it is almost constant in other area.

Figure 9A:
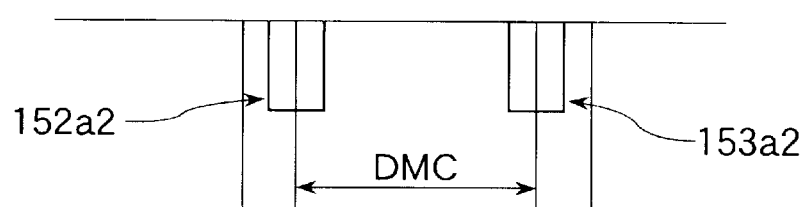
FIG. 9 is a schematic diagram illustrating information on the reference mark that are produced by the focusing detection sensor while the mark illuminator is turned on in the embodiment of the present invention.
Figure 9B:
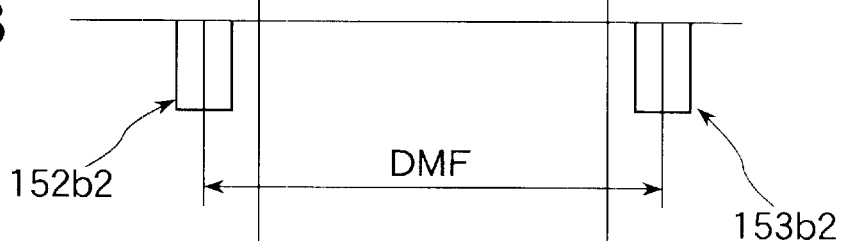
Figure 9C:
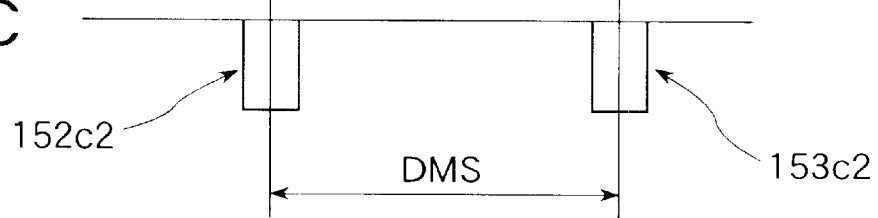

FIGS. 9(A), 9(B), and 9(C) respectively represent modules of shapes of signals produced by the focusing detection sensor in the cases where the optical length from the reference mark 1118 on the focusing plate 1116 to the focusing detection sensor 154 is longer than a design value (9A), where the optical length is shorter than the design value (9B), and where the optical length is as long as the design value (9C).

In FIG. 9(A), a waveform 152a2 is derived from an image which is fallen on the focusing detection sensor 154 by the separator lens 152 while a waveform 153a2 is derived from an image fallen on the same by the separator lens 153.

Similarly, in FIG. 9(B), a waveform 152b2 is derived from an image which is fallen on the focusing detection sensor 154 by the separator lens 152 while a waveform 153b2 is derived from an image fallen on the same by the separator lens 153.

Also similarly, in FIG. 9(C), a waveform 152c2 is derived from an image which is fallen on the focusing detection sensor 154 by the separator lens 152 while a waveform 153c2 is derived from an image fallen on the same by the separator lens 153.

In FIG. 9(C), a position deviation (phase difference) DMS of one beam of light from the other between the waveforms 152c2 and 153c2, which is used to detect the in-focus, is predetermined as a unique design value to the single-lens reflex camera of the present invention. The arithmetic operation unit 174 for determining a finder position preliminary stores a value of the position deviation DMS.

As shown in FIG. (9), when the optical length from the reference mark 1118 on the focusing plate 1116 to the focusing detection sensor 154 is longer than the design value, the operation unit 174 computes a position deviation (phase difference) DMC between the waveforms 152a2 and 153a2 and then compares the computation result with the DMS to determine the optical length from the reference mark 1118 to the focusing detection sensor 154.

In contrast, as shown in FIG. 9(B), when the optical length form the reference mark 1118 to the focusing detection sensor 154 is shorter than the design value, the operational unit 174 computes a position deviation (phase difference) DMF between the waveforms 152b2 and 153b2 and then compares the computation result with the DMS to determine the optical length from the reference mark 1118 to the focusing detection sensor 154.

After that, the arithmetic operation unit 176 corrects the result of a computed focal point on the object image based upon the result of the computed focal point on the object image produced by the operation unit 174 and the result of the computed optical length from the reference mark 1118 to the focusing detection sensor 154. The corrected computation result of the focal point on the object image is output to the output controller 178. An amount of correction resulted from the computation on the focal point is stored in the memory 177.

For instance, as shown in FIG. 9(A), when the optical length from the reference mark 1118 on the focusing plate 1116 to the focusing detection sensor 154 is longer than the design value, the previous computation result is corrected so that a reference value of an in-focus DJS is reduced by the difference between the DMC and the DMS.

On the contrary, as shown in FIG. 9(B), when the optical length from the reference mark 1118 on the focusing plate 1116 to the focusing detection sensor 154 is shorter than the design value, the computation result is corrected so that the reference value of the in-focus DJS is raised by the difference between the DMF and the DMS.

Figure 10:
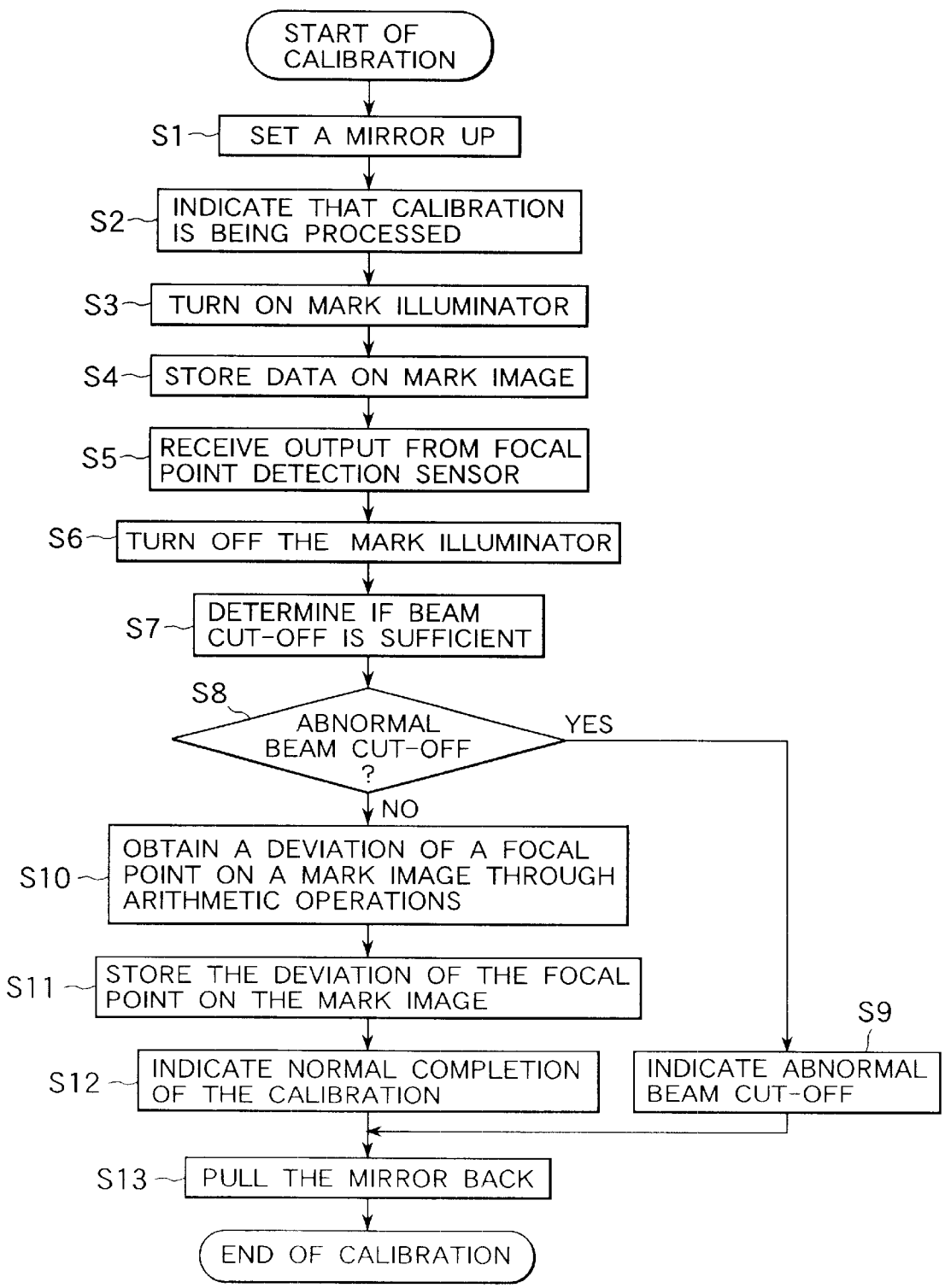
FIG. 10 is a flow chart showing a sequential procedure of a calibration mode in the embodiment of the present invention.

FIG. 10 shows a calibration procedure performed during the calibration mode. Upon turning the mode switch 166 on to select the calibration mode, the procedure is started. First, at step S1, the sensor controller 172 permits the mirror to be set up at horizontal level so as not deflect the light from the photographic lens 130 toward the focusing plate 1116. Then, at step S2, an indication that the calibration is continued is given through the display 156 by displaying the indication in a field of view of the viewfinder, for example. At step S3, the sensor controller 170 permits the mark illuminator 1120 to light up. At step S4, data on the image of the reference mark 1118 projected on the focusing detection sensor 154 is temporarily buffered, and the image data is transferred to the operational unit 174 at step S5. At step S6, the sensor controller turns the mark illuminator 1120 off.

At step S7, the operational unit 174 serving as a recognition means as well determines if beam cut-off is sufficient depending upon the level of the quantity of light in all the area other than the image of the reference mark 1118. When the light from the photographic lens 130 as well as the light from the mark illuminator 1120 falls on the focusing plate 1116, the quantity of light in the area other than the image of the reference mark 1118 tends to be higher than that in the case of sufficient beam cut-off, and this enables to determine the state of beam cut-off. If it is determined that the beam cut-off is abnormal at step S8, an indication is given that the calibration is not successful at step S9. If it is determined that the beam cut-off is normal at step S8, a succeeding process is performed at step S10. Although, in this embodiment, the state of beam cut-off is examined relying on the output from the focusing detection sensor 154, the output from a photometry sensor (not shown) may be reliable in such a determination.

At step S10, the operation unit 174 computes the defocusing length of the image of the reference mark 1118, and the operation unit 176 uses the defocusing length to compute the amount of correction of the image of the object. This amount of correction is stored in the memory 177 at step S11. Then, at step S12, an indication is given that the calibration is successfully completed. Finally, at step S13, the mirror is pulled back and the calibration is finished.

This embodiment is an application of the replaceable finder to the camera body that enables both the units to operate correlatively to set the mirror up, and the present invention can provide an additional application of the viewfinder that is not cooperative with the camera body. In this alternative application, before setting up the mirror to the horizontal orientation at step S1, it is judged if the camera body is cooperative in the aforementioned respect, and if not, an indication is given that the user should cut the beam off by attaching a lens cap to cover the photographic lens 130. In such a situation, the mirror does not have to be pulled back at step S13.

FIGS. 11(A) to 11(C) respectively show a calibration mode indicator provided in a lower portion of the field of view in the finder. Turning the mode switch 166 on to select the calibration mode, as shown in FIG. 11(A), a mark "C" 149g on the rightmost end of the indicator lights up and out to indicate that the calibration is still continued. When the calibration is successfully completed, as shown in FIG. 11(B), the mark "C" 149f coming up and out is turned to be continuously lighted. When there arises some abnormal effect during the calibration as in the case of insufficient beam cutoff, as shown in FIG. 11(C), a mark "E" 149f lights up and out. In this situation, the calibration must be restarted to repeat the procedure.

When the photographic mode is selected with the mode switch 166, the flux of light from the photographic lens 130, after being transmitted through the mirror 112, the condenser lens 114, the focusing plate 1116, and the detection optics and fallen onto the focusing detection sensor 154. Then, the focusing detection sensor 154 and the arithmetic operation unit 172 compute the defocusing length of the object 104 based upon the image formed on the focusing plate 1116. The defocusing length is transferred the operation unit 176. The operation unit 176 corrects the defocusing length based upon the amount of correction that has been computed during the calibration mode and stored in the memory 177.

The output controller 178 activates the display organizer 180 to permit the display 156 to indicate the corrected defocusing length of the object image received from the operation unit 176. The output controller 178 activates the sound organizer 182 to permit the sound generator 184 to make a signal depending upon the corrected defocusing length of the object image. For instance, the buzzer 186 makes a signal when the corrected defocusing length is zero, or when the image is in focus.

FIG. 12 shows an outer frame 149a of the field of view in the finder of the single-lens reflex camera according to the present invention. A frame 149b defining the detection area is depicted within the field of view in the finder, and the frame 149b is an image created b the reference mark 1118. Indications are given in an upper portion outside the field of view of the finder with letters 149c indicating shutter speed 1/250 and letters 149d indicating a predetermined aperture value 5.6.

A photometer built-in finder gives an indication in the upper portion of the field of view with graphical symbols 149 representing a determination result of exposure.

A green LED at the center lights up to indicate an appropriate exposure, an orange LED on the right lights up to indicate an underexposure, and a red LED on the left lights up to indicate an overexposure. As the underexposure is advanced, a larger number of red LEDs come up. Those red LEDs are triangles with their respective apexes raised high while the orange LEDs are triangles with their respective bottom side up.

Symbols 149g are given in a lower portion outside the field of view in the finder to indicate the detection result of the focal point on the image of the object.

A center diamond and a green LED light up to indicate an in-focus state, an orange LED on their right side lights up to indicate rear-cell focusing, and a red LED on their left side lights up to indicate front-cell focusing. As the required rear-cell focusing is advanced, a larger number of orange LEDs come up. As the required front-cell focusing is advanced, a larger number of red LEDs come up. The red and orange LEDs are square in shape.

In this way, the detection results of the focal point on the object image can be clarified.

In the preferred embodiment according to the present invention, the calibration is performed without effect of light from the photographic lens 130. The corrected value of the defocusing length can be stored in the memory 177, and hence, there is no need of repeating the calibration for every photo shooting. In this manner, the calibration is not required in advance of detecting the defocusing length of the object image each time a photograph is taken, and thus, a period of time required to detect a focal point can be shortened. The memory 177 may be formed of nonvolatile memory, so that even once the power is off in the finder, there is no need of repeating the calibration when the camera and finder is used next time to take a picture.

As has been described, a single-lens reflex camera used with a replaceable viewfinder according to the present invention incorporates a focusing detection sensor into the finder to attain a feature that enables a camera user to confirm an indication of a result of an electronic detection of a focal point on an image of an object, and thus, a detection deviation resulted from varied combinations of compatible but independent units of the replaceable finder and camera body can be corrected while additional detection deviations of the focal point resulted from temperature change and aged deterioration can be corrected, thereby attaining enhanced accuracy in detecting the focal point on the object image.

Although the best mode of the present invention has been described, a person having an ordinal skill in the art would evaluate that various modifications and variations are made to the aforementioned embodiments without departing the true scope and spirit of the present invention, which are defined in the appended claims.

What is claimed is:

1. A single-lens reflex camera comprising
   a camera body having a focusing plate with a reference mark in an optically equivalent position to film,
   a viewfinder replaceably attached to the camera body,
   means positioned in the viewfinder for detecting a focal point,
   means positioned in the viewfinder for determining deviations for the reference mark and the focal point, respectively,
   calibration means receiving the output from the deviation determining means for correcting data on the focal point, and
   means enabling a user to activate the calibration means.

2. A single-lens reflex camera according to claim 1, wherein the calibration means includes a memory to store a result of the calibration on an optical length.

3. A single-lens reflex camera according to claim 1, wherein the calibration means further includes illumination means placed in the camera body or the viewfinder for irradiating the reference mark.

4. A single-lens reflex camera according to claim 3, wherein the calibration means is used under a condition where light entering the camera body through a photographic lens is cut off.

5. A single-lens reflex camera according to claim 4, wherein the calibration means further includes sensing means for determining if the light entering the camera body through the photographic lens is satisfactorily cut off.

6. A single-lens reflex camera according to claim 1, further comprising means for giving a warning or a display to a user to let the user to know that the calibration means is in the use.

7. A viewfinder used with a single-lens reflex camera and replaceably attached to a camera body having a focusing plate therein, the viewfinder being capable of detecting a reference mark which is formed in the focusing plate and positioned in an optically equivalent position to film, and the viewfinder comprising
   means for determining a focal point in the finder,
   means for determining deviations for the reference mark and the focal point, respectively,
   calibration means receiving the output from the deviation determining means for correcting data on the focal point, and
   means enabling a user to activate the calibration means.

* * * * *